United States Patent [19]

Yates

[11] 4,132,765

[45] Jan. 2, 1979

[54] RECOVERY OF FLUORIDE VALUES

[75] Inventor: Paul C. Yates, Wilmington, Del.

[73] Assignee: E. I. Du Pont de Nemours and Company, Wilmington, Del.

[21] Appl. No.: 755,123

[22] Filed: Dec. 28, 1976

Related U.S. Application Data

[63] Continuation of Ser. No. 590,493, Jun. 26, 1975, abandoned, which is a continuation-in-part of Ser. No. 590,492, Jun. 26, 1975, abandoned, which is a continuation-in-part of Ser. No. 238,477, Mar. 27, 1972, abandoned, which is a continuation-in-part of Ser. No. 169,077, Aug. 24, 1971, abandoned.

[51] Int. Cl.² ............................................. C01B 7/22
[52] U.S. Cl. .............................. 423/484; 423/321 R; 423/321 S
[58] Field of Search ............... 423/462, 484, 555, 556, 423/483, 465, 317, 320, 321 S, 321 R, 485

[56] References Cited

U.S. PATENT DOCUMENTS

| | | | |
|---|---|---|---|
| 1,838,431 | 12/1931 | Milligan | 23/312 P UX |
| 1,929,441 | 10/1933 | Milligan | 23/312 P UX |
| 2,493,915 | 1/1950 | Cross et al. | 23/312 P UX |
| 2,885,265 | 5/1959 | Cunningham | 23/312 P UX |
| 2,981,601 | 4/1961 | Kidde | 423/483 |
| 3,207,579 | 9/1965 | Burkhardt | 423/485 |
| 3,433,592 | 3/1969 | Baniel et al. | 23/312 P UX |
| 3,469,939 | 9/1969 | Aiso et al. | 423/483 |
| 3,512,927 | 5/1970 | Betts | 423/320 X |
| 3,671,189 | 6/1972 | Betts | 423/320 X |
| 3,718,736 | 2/1973 | Watson et al. | 423/485 |
| 3,825,655 | 7/1974 | Eipeltauer et al. | 423/483 X |
| 4,065,547 | 12/1977 | Leroy et al. | 423/321 S |

FOREIGN PATENT DOCUMENTS

| | | | |
|---|---|---|---|
| 557004 | 7/1932 | Fed. Rep. of Germany | 423/321 R |
| 2101759 | 8/1971 | Fed. Rep. of Germany | 423/321 S |
| 464370 | 4/1937 | United Kingdom | 423/321 S |

*Primary Examiner*—Earl C. Thomas
*Assistant Examiner*—Thomas W. Roy

[57] ABSTRACT

The fluoride values of fluorapatite ores can be recovered by using reactive metal compounds, e.g., the sulfates, phosphates or hydroxides of aluminum, iron, titanium, zirconium, antimony or chromium, to tie up the fluorides during acid attack on the ores and thus minimize the formation of fluosilicic acid. The soluble metal fluoride salts formed can subsequently be separated and treated with acid to recover hydrogen fluoride.

2 Claims, No Drawings

RECOVERY OF FLUORIDE VALUES

CROSS-REFERENCE TO RELATED APPLICATIONS

This is a continuation of appln. Ser. No. 590,493, filed 6/26/75, now abandoned, which is a Continuation-In-Part of appln. Ser. No. 590,492, filed 6/26/75, now abandoned, which is a Continuation-In-Part of appln. Ser. No. 238,477, filed 3/27/72, now abandoned, which is a Continuation-In-Part of appln. Ser. No. 169,077, filed 8/24/71, now abandoned.

BACKGROUND OF THE INVENTION

There is a rapidly expanding demand for fluoride based chemicals, both of the organic type such as fluorinated hydrocarbons, e.g., "Freon", and polytetrafluoroethylene resins, as well as for inorganic fluorides, such as aluminum fluoride and cryolite employed in the manufacture of metallic aluminum. The traditional raw material for these chemicals has been fluorspar, or calcium fluoride. Unfortunately, known reserves of high grade fluorspar ores have not expanded as rapidly as the demand for fluorine chemicals.

The only other potentially large sources of fluorine are the very extensive deposits of fluorapatite ore. This material is the principal constituent of the phosphate ores used in the manufacture of wet process phosphoric acid and phosphate fertilizers.

The art is replete with complex processes having the objective of recovering the fluoride values from these phosphate ores, either in the form of anhydrous hydrofluoric acid, or as aluminum fluoride. Representative of such art are U.S. Pat. Nos. 3,063,799; 3,024,086; 2,780,523; 2,588,786; 3,110,562; 3,219,410; 3,128,152; 3,195,979, 3,338,673; 3,101,254; 3,258,308; 3,218,128; 3,326,634; 3,256,061; 3,455,650; 3,511,603; and 3,316,000. Virtually all such processes use as a starting material fluosilicic acid, which has been recovered as a by-product of the manufacture of phosphoric acid and calcium phosphate fertilizers from the fluoride-containing phosphate ores.

Fluosilicic acid originates when strong mineral acids such as sulfuric, phosphoric, hydrochloric, or nitric acid are used to attack the fluorapatite ore, as is shown, for sulfuric acid, in equations (1) and (2) below:

(1) 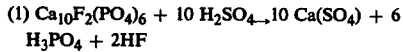 + 6 H$_3$PO$_4$ + 2HF (2) 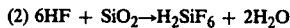 + 2H$_2$O

It should be noted that the hydrofluoric acid generated in reaction (1) reacts as shown in equation (2) to form fluosilicic acid. There is almost always sufficient silica associated as an impurity with the phosphate ore, that the hydrofluoric acid created is converted to fluosilicic acid under current operating procedures.

Many of the problems associated with the proposed recovery processes of the prior art stem from the characteristics of the fluosilicic acid starting material. Fluosilicic acid is volatile, highly corrosive, and toxic to plant, animal and marine life. Much of the cost of operation of current wet process phosphoric acid plants occurs as a result of these properties. Its volatility creates problems of the evolution of toxic and corrosive fumes which have to be trapped in scrubbers. Its toxic and corrosive character requires expensive waste disposal procedures. Expensive and exotic materials of construction are required for mechanical equipment such as pumps, tanks impellors, etc., used in the phosphate industry, because of the highly corrosive nature of process streams which contain fluosilicic acid.

Also the presence of fluosilicic acid limits the application of the wet process phosphoric acid product prepared from the phosphate ores. Such acid contains appreciable quantities, often 50% or more, of the fluoride originally present in the ore, and for this reason calcium or ammonium phosphates prepared from wet process phosphoric acid cannot be employed, for example, as animal feed supplements.

The prior art processes are often characterized by poor yields. This is in part due to the fact that only a portion of the fluorine in the ore is recoverable in the form of fluosilicic acid. Large percentages of the fluorine are found either in the waste streams or in the end product phosphoric acid and in fertilizers prepared from it.

The previously mentioned characteristics of fluosilicic acid also require that any process based upon recovery of fluoride values from fluosilicic acid be constructed of suitable equipment. For example, glass cannot be employed, since it is rapidly attacked, as is mild steel and even stainless steel. The volatility of H$_2$SiF$_6$ also limits the range of processes which can be applied to it.

U.S. Pat. No. 3,619,136, discloses a process to preferentially dissolve the calcium and P$_2$O$_5$ content of phosphate ores in a recycle phosphoric acid which is saturated with fluoride and with other minor impurities, to leave an insoluble residue of calcium fluoride, silica, and iron and aluminum phosphates. After sedimentation to remove this residue, the patent teaches reaction with sulfuric acid to precipitate the calcium as gypsum and the recovery of a fluoride-saturated phosphoric acid for recycle and as a product.

SUMMARY OF THE INVENTION

I have found that the difficulties mentioned above can be prevented by a process that avoids the formation of fluosilicic acid at any stage during the processing of fluorapatite ore. This process is accomplished by providing a reactive metal compound selected from the compounds of aluminum, titanium, zirconium, trivalent iron, tri- and pentavalent antimony, and trivalent chromium, in sufficient quantities during the transformation of the ore, e.g., during the acid attack, to convert substantially all the fluorine contained in the ore to a water-soluble, non-volatile fluoride complex of one of the metals of the invention. The salts of the above metals form fluorocomplexes which are thermodynamically more stable than the fluorocomplexes of silicon thus prevent the formation of fluosilicic acid. Subsequently the water-soluble fluoride complex is separated from the insoluble reaction products and impurities resulting from the decomposition of the ore.

The quantities and nature of these reactive metal compounds are chosen in such a fashion that the fluorine is always more stably bonded to them than it would be to silicon. This can be specifically monitored by using a fluoride-sensitive, specific-ion electrode such as the lanthanum fluoride electrode manufactured by Orion, Inc. As long as a sufficient amount of one of the reactive metals of the invention are added to maintain solution fluoride activity lower than the equilibrium activity characteristic of silicon-fluoride complexes, the objectives of the invention will be achieved. Thus, the formation of fluosilicic acid is avoided, and most of the problems discussed above are either completely avoided, or greatly reduced. For example, it is not necessary to provide expensive scrubbers, since no volatile fluoride species are emitted. This not only reduces the cost of wet process phosphoric and fertilizer plants, but greatly minimizes the pollution threat posed by them. Cheaper and more commonly employed materials of construction can be used, since the fluoride activity is maintained at a very low level by the fluoride scavenging metal salts. Thus, operations can be performed in glassware with no etching of the glass. Stainless steel can be used, as can many other materials of construction normally precluded by the high fluoride activity of fluosilicic acid. The toxicity hazard of fluoride is also reduced, since the fluoride activity is maintained at a much lower value.

Finally, recoveries of fluoride substantially exceed those obtainable with processes of the prior art, since there is no loss of volatile fluorides at any stage of the process, and there is substantially reduced loss to either the by-products of the invention, or to its end products, such as phosphoric acid and phosphate-based fertilizers.

DETAILED DESCRIPTION OF THE INVENTION

The reactive metal compound as used herein refers to any compound which is capable of reacting with fluorine contained in said ore to convert the fluorine into a water-soluble fluoride complex with the metal, said complex being sufficiently stable to prevent the formation of fluosilicic acid.

The metal of the useful reactive metal compounds can be aluminum, titanium, zirconium, trivalent iron, trivalent antimony, pentavalent antimony or trivalent chromium. Preferred for use are aluminum, titanium, zirconium or trivalent iron.

The reactive compound of one of the metals previously mentioned normally is supplied as a water-soluble salt, such as a chloride, nitrate, sulfate, phosphate, bromide, perchlorate, acetate, certain carbonates, hydroxyacetate, etc. Insoluble salts such as the metal hydroxides and certain metal carbonates may also be employed, providing their particle size is sufficiently small that they will react rapidly when in contact with the acidified solution used to attack the ore. For example, aluminum hydroxide of a finely divided form when added to the acid solution can be used in this fashion.

It is also possible to derive the reactive metal compound — $H_2SO_4$ solution used in attacking the ore by the acidification with sulfuric acid of aluminosilicate and/or aluminophosphate clay minerals followed by filtration to remove the $SiO_2$ and other impurities.

The most preferred metal compounds are those which are low in cost or form a highly soluble species in the reaction mixture. These include sulfates, phosphates, chlorides, nitrates, hydroxides, and carbonates.

In general, the molar content of the reactive metal compound relative to the molar content of fluorine in the ore can range from $1/(V+3):1$ to $2:1$, where V is the valence of the metal cation. This range will be useful, particularly for pollution control purposes; however, it is preferred the reactive metal compounds of the invention will be supplied in molar quantities relative to molar content of the fluorine in the ore ranging from $1/V$ to $1:1$. There is little point in supplying the metal compound in a large excess over a 1:1 mole ratio, since the monofluoro complexes represent the lowest fluoride to metal compounds formed. Amounts of metal compound in excess of this can be employed, where desired, to furnish an extra driving force in the reaction, or to accelerate the reaction of attack on the ore, kinetically, but such excess will usually not exceed by a factor of 2 that required to react in a 1:1 molar ratio with the fluoride content of the ore.

It will generally be found necessary to supply an amount of the metal compound based on the fluoride present in the ore, of at least $1/V$, where V is the valence of the metal cation. Quantities less than this would require the formation of fluoro complexes of an anionic character such as $AlF_4^-$, $AlF_6^{-3}$, $ZrF_5^-$, $ZrF_6^{-2}$, etc. These anionic higher fluoro complexes are generally much less stable than those complexes in which the fluorine content does not exceed, on a molar basis, the valence of the metal. In many instances they are not sufficiently stable to fully prevent the formation of fluorosilicic acid, and thus the use of quantities of metal less than $1/V$ per mole of fluoride contained in the ore, while they may ameliorate corrosion, pollution and toxicity problems, do not do so to the degree which is characteristic of the preferred ratios.

It is to be understood that certain ores may contain small quantities of the active metals of this invention as impurities which may be brought in to solution during an acid attack on the ore. In particular, metals such as aluminum and iron are sometimes found in phosphate ores. When such aluminum and/or iron impurities are solubilized during the acid attack, they can contribute to the total aluminum and/or iron that is required to decrease the fluoride activity and correspondingly less reactive metal salt will be needed to prepare any particular desired metal fluoro complex.

A variety of techniques for attacking the fluorapatite ore may be employed within the scope of the concept of this invention. For example, the ore may simply be reacted with an aqueous solution of one of the metal compounds of the invention to sequester the fluorine content of the ore and provide insoluble defluorinated ore for further processing, along with an aqueous solution of a metal fluoride complex.

Alternatively, one of the metal compounds of the invention may be supplied in conjunction with a mineral acid such as sulfuric acid, phosphoric acid, nitric acid, hydrochloric acid, or the like, to more completely attack the ore and convert it into more soluble phosphates such as monocalcium phosphate, dicalcium phosphate, or tricalcium phosphate. Preferred for use are phosphoric or sulfuric acid in an amount sufficient to react with the total calcium content of the ore to form insoluble calcium compounds.

In the most preferred embodiment, one of the metal compounds of the invention can be employed in conjunction with a sufficient amount of a mineral acid to completely convert all phosphate contained in the ore into aqueous phosphoric acid. The product obtained will be a mixture of a soluble fluoride of one of the metals of the invention mixed with phosphoric acid. For this embodiment the use of sulfuric acid is preferred in an amount sufficient to react with the total calcium content of the ore and liberate a mixture of phosphoric acid and a soluble metal fluoride.

The three above processes for attacking the ore are illustrated in the following equations:

(3) $Ca_{10}F_2(PO_4)_6 + Al_2(SO_4)_3 \rightarrow 2AlF(SO_4)_{aq} + CaSO_4 \downarrow + 3 Ca_3(PO_4)_3$ (4) $Ca_{10}F_2(PO_4)_6 + Al_2(SO_4)_3 + 3 H_2SO_4 \rightarrow 2AlF(SO_4)_{aq} + 6Ca(HPO_4) \downarrow + 4 CaSO_4 \downarrow$ (5) $CA_{10}F_2(PO_4)_6 + Al_2(SO_4)_3 + 9H_2SO_4 \rightarrow 2AlF(SO_4)_{aq} + 10 Ca(SO_4) \downarrow + 6 H_3PO_{4a}$ In equation (3), the ore is simply defluorinated by reaction with one of the reactive metal salts of the invention. In equation (4) the ore is defluorinated and converted simultaneously into a less insoluble form of calcium phosphate, whereas in equation (5), the ore is more completely attacked and the product is an aqueous solution of phosphoric acid containing a metal fluoride salt of the invention.

It is to be understood that situations intermediate between those illustrated can also be employed. For example, equation (5) illustrates the use of sufficient sulfate ion to completely precipitate all calcium present in the ore whereas equation (4) represents the use of an amount sufficient only for a partial conversion of the calcium values in the ore to calcium sulfate. It is also possible to operate with amounts of sulfate which would convert more of the calcium than illustrated by equation (4) but less than that illustrated by equation (5) to insoluble $CaSO_4$. Such partial reaction of sulfate with calcium can be a preferred embodiment when the fluoride values are later to be precipitated as calcium aluminum fluoride complex salts or separated from phosphate values by solvent extraction as will be described in greater detail hereafter.

While the above reactions are written with aluminum salts at a 1:1 aluminum to fluoride mole ratio, it is to be understood that entirely comparable equations can be written at other mole ratios of metal ion to fluoride within the ranges previously discussed, and involving either different cations selected from the group previously noted, or different anions. If desired, it is also possible to attack the ore with mixtures of the reactive metal salts of the invention.

The conditions to be employed in attacking the ore will vary somewhat according to which of the end products is desired, the nature of the particular metal salt employed, and with the nature of the ore itself. However, generally the ore will be contacted with a concentrated solution of one of the metal salts of the invention either in an aqueous solution, in admixture with mineral acids, or in a pure mineral acid containing essentially no water.

It is preferred that the ore be in a finely divided form, e.g., less than 100 mesh.

The time and temperature of reaction will depend on a number of variables, and will range from about 60° C. to approximately 300° C., preferably from 95°-120° C. When aqueous solutions are employed to attack the ore at temperatures above 100° C., pressure equipment can be used. The time of attack will vary inversely with the temperature and will range from 16 hours or slightly longer at a temperature of about 60° C. to about two minutes at 300° C. The longer times are preferred when acid is not used, and when acid is used, times of 8 hours to 2 minutes are preferred. When concentrated mineral acids in high concentrations are used, it is desirable to keep the temperature below 200° C. to avoid the possibility of decomposing the metal fluoride products.

The most preferred attacking conditions are those which fall in the so-called hemi-hydrate range of operation. The art is familiar with the fact that with dilute phosphoric acid solutions and low temperatures the calcium sulfate species precipitated by reaction with sulfuric acid is calcium sulfate dihydrate, at higher $P_2O_5$ concentrations and higher temperatures, the stable species precipitated is calcium sulfate-one-half hydrate, and at still higher temperatures and higher $P_2O_5$ concentrations, the stable species precipitated is anhydrous calcium sulfate. It is advantageous to be able to operate the process at the highest possible $P_2O_5$ levels since this minimizes the cost of evaporating the phosphoric acid product to higher concentrations after it has been prepared in the reaction. It is also advantageous to operate at higher $P_2O_5$ levels and higher temperatures such as the hemi-hydrate or anhydrite conditions because of shorter reaction times, lower weights and volumes of calcium sulfate cakes, more complete reaction of the attacking solution with the ore, and more easily filtered cakes. However, the majority of prior art procedures (including most commercial installations) are operated in the dihydrate range of conditions in spite of the potential advantages described above. This is largely because of the extremely corrosive character of the sulfuric acid, phosphoric acid, fluorosilicic acid mixtures produced by prior art processes and because of the desire to avoid evolution of fluorosilicic acid vapors in the reactor stage of the process where scrubbers are not normally employed.

One of the benefits of the process of this invention is that the low fluoride activity and the low volatility of the active metal fluoro complexes minimizes corrosion and volatilization problems and allows operation with conventional equipment in the half hydrate and anhydrite range of conditions. Thus it is possible to obtain higher productivity at higher concentrations of phosphoric acid products.

Thus it is preferred that the phosphoric acid concentration employed as a reaction solvent be maintained in the range of from 40% $P_2O_5$ to about 60% $P_2O_5$ and that the reaction temperature be from 95° C. to about 120° C.

In general, the conditions of attack of the ore will otherwise be similar to those which are conventional in wet process phosphoric acid plants now existing, particularly when the end product desired is a mixture of phosphoric acid and a soluble fluoride. Typical operating conditions for such plants are described in Kirk and Othmer's Encyclopedia of Chemical Technology, 2nd edn., 9, Interscience Publishers, in a chapter on fertilizers, pages 25 through 150, or as described in Chapters 16 and 17, pages 1025 through 1147 of a book entitled "Phosphorus and its Compounds", 2, Technology, Biological Functions and Applications, by Van Wazer, Interscience Publishers, 1958.

When only a partial attack of the ore or only defluorination is performed, higher temperatures and/or longer reaction times may be required, since the rate of attack is not as great in aqueous salt solutions as in concentrated solutions containing strong mineral acids.

Following the attack on the ore, in some embodiment of the process, a solution of one of the soluble fluorides of the invention will be obtained in admixture with essentially insoluble calcium sulfate and/or calcium phosphate species. This mixture can be filtered, centrifuged, or otherwise processed in the conventional fashion to separate the soluble fluoride species from the insoluble materials. The soluble metal fluorides will also be separated at this point from silica impurities which were original constituents of the ore. These will remain behind as an insoluble material with the other insoluble materials noted above.

Certain amounts of impurities may be associated with the soluble fluoride product originating either as impurities in the original ore, or from a failure to achieve completely stoichiometric reactions with the ore. Therefore, it will usually be desirable to recover the fluoride values from the attack solution by a processing step which allows for purification from such impurities as a part of the isolation procedure. If the impurity level is not too high, it will be possible, of course, simply to evaporate the aqueous solution to dryness or until the solubility product of the fluoride-containing salt is exceeded. It can then be crystallized from solution, which, in itself, may substantially improve the purity of the end product.

In other embodiments wherein other materials are in solution with the soluble fluorides after the attack on the ore, e.g., phosphoric acid, other procedures which are conventionally used to purify and separate compounds from aqueous solutions containing them can be employed. For example, the soluble fluoride compounds can be solvent-extracted into a water-immiscible solvent which can then either be evaporated or back-extracted with water to recover a purified form of the fluoride compound. Conversely phosphoric acid can be solvent extracted leaving the fluoride compounds in the aqueous phase. This can be done for example with low molecular weight alcohols such as methanol, ethanol, isopropyl alcohol and butanol. Other relatively polar organic solvents in which phosphoric acid has a high solubility such as dioxane, various ethers, etc., can also be employed in a similar fashion. Similarly, the metal fluorides can be picked up on either anion or cation exchange resins and later desorbed by suitable processes from these resins, which will also effect a purification. Selected precipitation can also be used as a procedure for effecting purification from impurities. For example, sodium fluoride or ammonium fluoride can be added to precipitate the fluoride compounds as the relatively insoluble, higher complex fluorides. Thus, sodium fluoride can be added to a solution containing aluminum and the fluoride content of the ore, to precipitate the quite insoluble sodium aluminohexafluoride or cryolite. Comparable reactions to form insoluble complex fluorides between monovalent ions such as ammonium, sodium, potassium, and lithium fluorides can also be performed with the other fluoride-containing species such as zirconium, titanium, iron, etc.

Selective precipitation reactions can be used involving soluble divalent metal ions. For example, magnesium phosphate or sulfate is relatively soluble, and can be added to solutions of aluminum fluoride and phosphoric acid to recover the fluoride values as insoluble complex magnesium-aluminum fluoride species.

Selective precipitation can also be brought about by an appropriate adjustment of the pH. Again taking on aluminum fluoride-phosphoric acid mixture as an example, the pH can be adjusted to about 5 with ammonium hydroxide to form a soluble ammonium phosphate fertilizer material and precipitate out a relatively insoluble ammonium aluminum fluoride.

Selective precipitation can also be brought about by the addition of low molecular weight water-miscible solvents such as methanol and ethanol. Such solvents can lower the solubility of species such as calcium-aluminum fluorophosphate, calcium aluminum fluorosulfates, aluminum fluoride, aluminum fluorophosphate, aluminum fluorosulfate, and the like. Phosphoric acid and sulfuric acid as dissolved constituents are much more soluble in the water-miscible organic solvents such as methanol and remain in solution. One preferred method of separation is to add methanol plus a source of either a divalent or a monovalent cation such as sodium, lithium, ammonium, magnesium, calcium, etc. to take advantage of the relative insolubility in methanol-water mixtures of the type of species described above and of their double salts such as potassium aluminum fluorophosphate. In such mixtures an almost analytical separation of the fluoride values from phosphoric acid can be achieved.

Another method for precipitating calcium compounds such as calcium aluminum fluorophosphate is to make the initial attack on the ore with an insufficient amount of sulfuric acid, leaving in solution calcium dihydrogen phosphate, phosphoric acid and aluminum fluoride and then to add methanol to precipitate calcium aluminum fluorophosphate leaving in solution relatively pure phosphoric acid. Such reactions proceed with high yields as will be demonstrated further in the examples.

If desired, the calcium necessary to form the calcium aluminum phosphate precipitate upon the addition of methanol can also be supplied in the form of a solution of calcium dihydrogen phosphate in phosphoric acid prepared separately.

In certain instances, purification can be effected by distillation. For example, antimony pentafluoride and titanium tetrafluoride are both volatile at reasonable temperatures. Thus, titanium tetrafluoride can be sublimed from a mixture of titanium tetrafluoride and impurities, and the purified sublimate recovered. This can be done at a temperature of about 280° to 300° C. Similarly, antimony pentafluoride volatilizes rapidly at temperatures in the neighborhood of 150° C.

Crystallization is a preferred process for effecting purification. For example, when aluminum trifluoride is obtained in an aqueous solution, it can be heated at 100° C. for approximately 4 hours at a fluoride concentration of about 14 weight percent and insoluble beta aluminum trifluoride trihydrate can be recovered.

Another separation-purification technique is illustrated by Example 5. Here the mixture of soluble fluoride and phosphoric acid are treated with $Ca(H_2PO_4)_2$ to form an insoluble fluoride double salt of calcium and the metal fluoride which can be separated from the acid by filtration. The $Ca(H_2PO_4)_2$ should be added in an amount equal to one mole of calcium per mole of sulfate in the mixture plus one mole of calcium per five moles of fluoride in the mixture.

As previously noted, methanol can be employed in one preferred method of separation to enhance the insolubility and therefore increase the yield of calcium aluminum fluorophosphate species. Particularly if the insolubility is enhanced with methanol, there is a wide range of fluorine to aluminum ratios in compounds which are relatively insoluble under such conditions. Because of the insolubility of this whole class of calcium aluminum fluorophosphates salts in the presence of appreciable quantities of methanol, substantial choice can be exercised as to the ratio of aluminum to fluorine or calcium to fluorine that can be employed during acid attack on the ore when followed by this method of separation to separate the phosphoric acid values from the fluoride values.

The insoluble fluoride double salt can then be dried and reacted with sulfuric or phosphoric acid to form anhydrous hydrogen fluoride and a metal phosphate or sulfate.

The initial separation of the fluoride values from the bulk of the phosphoric acid may not be 100% complete in the sense that species such as calcium aluminum fluorophosphate are precipitated. These, of course, still have some of the phosphate value of the rock associated with the fluorine. For certain purposes this may be undesirable. For example, in reacting such materials with sulfuric acid to prepare completely anhydrous HF, the presence of phosphates in such reactions can lead to the undesirable formation of fluorophosphate species in addition to the desired HF product. Also the fluorine content of such complex salt precipitates may be undesirably low. Thus if the fluorine content of such a precipitate were to be, for example, only 15%, excessively large equipment might have to be employed in preparing anhydrous HF from such a precipitate. Therefore, it is often desirable, once the bulk of the separation has been achieved, to further process the initial precipitate and remove phosphoric acid, calcium and any other undesirable impurities. Various procedures can be employed to do this. If the associated impurities are soluble in water, the precipitate can simply be boiled with water and this may remove a substantial portion of the undesirable impurities. Chemical methods can also be employed. For example, with a precipitated product such as $CaAlF_3 (H_3PO_4)_2$, which is one of the species that can be prepared by methanol addition to solutions containing calcium, aluminum, fluorine and phosphoric acid, a stoichiometric amount of sulfuric acid can be added to react with the calcium thereby converting it to insoluble calcium sulfate and leaving a solution of aluminum fluoride and phosphoric acid. The fluoride can be still further enriched by processing this material to remove the phosphoric acid. This can be done by second precipitation of the aluminum fluoride upon addition of water-miscible, low molecular weight alcohol such as methanol, ethanol, isopropanol and like, again taking advantage of the relatively high solubility of phosphoric acid in such water-solvent mixtures and the relatively low solubility of metal fluoride salts. Solvent extraction procedures can also be used. For example, water saturated butanol can be used to selectively extract the phosphoric acid leaving behind a solution of aluminum fluoride which contains little, if any, phosphate.

Ion exchange reactions can also be employed. For example, phosphoric acid and phosphates are rather strongly adsorbed on anion exchange resins, whereas aluminum fluoride complexes and fluoride, in general, are only weakly adsorbed on such resins. Thus it is possible to selectively absorb the phosphate values by means of an anion exchange resin.

Once a relatively pure solution of aluminum fluoride in water free from phosphate has been obtained by one of the above procedures, it can be recovered by drying, or by adding a nonsolvent such as methanol.

It should be understood that in all of the above discussions it has been assumed for simplicity that the metal fluoride species would be a single pure material such as an aluminum fluoride species. Since the process of the invention deals with naturally occurring ores, the purity of the ore will vary. For example, if iron is present as an impurity in the ore, which it often is, a certain amount of iron will be usually incorporated as ferric fluoride along with the aluminum fluoride. This is due to the fact that the stability of iron complexes of fluorine is fairly close to that of similar aluminum complexes and also since iron is a trivalent cation of similar ionic size to aluminum.

The presence of this iron is generally not a matter of concern since the iron impurity in the ores simply augments the fluoride scavenging activity of the added reactive metal salts of the invention. If for a specific end use, iron is undesirable as an impurity, various conventional procedures for separating iron and aluminum compounds can be applied. Similarly, if upon recycle the iron concentration and/or the aluminum concentration continue to build up in the recycle stream as a result of the presence of such impurities in the ore, a certain portion of the recycle stream can be discarded or employed for other purposes and/or appropriate separation procedures can be applied to decrease the iron to satisfactory levels.

The impurities left behind after any of these purification procedures may retain various amounts of fluoride and phosphate values. In this case, the impurities can be recycled back into the process in the form of make-up solutions for further attack on the ore, or, if dry, they can be dissolved in the attacking solutions.

Following purification by crystallization, selective precipitation, solvent extraction, sublimation, etc., the metal fluorides of the invention can be dried, for example, aluminum fluoride trihydrate can be heated to prepare anhydrous aluminum fluoride. For many end uses, i.e., the manufacture of hydrogen fluoride, it is desired that the metal fluoride be heated to the stage where its water content is equal to or less than its fluoride content on a molar basis.

In certain instances, such compounds will in themselves be the desired end product of the process. For example, aluminum fluoride, cryolite, titanium tetrafluoride, zirconium tetrafluoride, and antimony tri- and pentafluorides are useful as fluorinating agents for organic compounds, as catalysts, and, in the case of aluminum fluoride and cryolite, in aluminum manufacture.

In other cases, however, it will be desirable to convert the anhydrous metal fluoride to anhydrous hydrofluoric acid, thus regenerating the original metal salt to use in attacking a second batch of ore.

A convenient method of accomplishing this is the reaction between such anhydrous metal fluorides and heavy mineral acids such as sulfuric and phosphoric acid. This method will generate anhydrous hydrofluoric acid of high purity. These reactions proceed smoothly at temperatures substantially lower than those required to prepare anhydrous hydrofluoric acid by most other procedures. Thus temperatures between 150° – 400° C. with 200° to 325° C. being preferred, can be employed.

For example, the preparation of hydrofluoric acid as done in current industrial practice from calcium fluoride, requires temperatures as high as 375° C. in at least a portion of the reaction zone to ensure a complete recovery of the fluoride values. Similarly, some of the complex processes which have been proposed for recovering anhydrous HF from fluosilicic acid involve very high temperatures. For example, U.S. Pat. No.

3,511,603 proposes to make anhydrous metal fluorides from fluosilicic acid and then react them by hydrolysis reactions with steam at temperatures in the neighborhood of 550° to 810° C. Other proposals involve the hydrolysis of silicon tetrafluoride with steam to form silica and anhydrous HF; this requires temperatures on the order of 800° C. Other processes involve the preparation of sodium hydrogen fluoride or potassium hydrogen fluoride, followed by heating to recover anhydrous HF and sodium or potassium fluoride. These reactions proceed at temperatures in the neighborhood of 500° C.

The high temperatures required by these prior art procedures impose serious problems for the hydrofluoric acid generating reactor. Extremely expensive alloys, e.g., nickel-base alloys and the like, are often required to withstand the combination of high temperature and corrosive conditions.

While certain of these prior art processes for recovering anhydrous HF can be applied to the metal fluorides of the process of the invention, the preferred process is to react one of the metal fluorides with either sulfuric acid, or even more preferably, with a mixture of $SO_3$ and steam to generate a high temperature, with phosphoric acid, or with a mixture of $P_2O_5$ and steam. More or less conventional equipment of the type which is now used in generating HF from calcium fluoride can be employed, with the advantages noted above that reaction temperatures can be lower, i.e., 100° to 375° C., and materials of construction of a cheaper nature may therefore be employed.

Other advantages of the processes of the invention are that the original metal salt used for attacking the ore can be regenerated in a cyclical fashion, recirculated back into the process, and thus there is no net loss of metal values except the incidental loss caused by incomplete washing, etc., of the type which is normally found in all cyclical processes. Such a cyclical process is illustrated, for example, in equations (7) through (10).

(7) $3\ Ca_{10}F_2(PO_4)_6 + 27\ H_2SO_4 + Al_2(SO_4)_3 \rightleftarrows 2\ AlF_{3(aq)} + 18\ H_3PO_{4(aq)} + 30\ CaSO_4 \downarrow$ (filter to remove $CaSO_4$ and $SiO_2$)

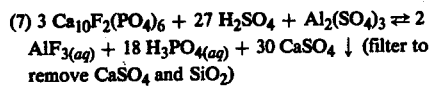

(8) $2AlF_3(aq) + 18\ H_3PO_4 + 2CaF_2 \rightarrow 2CaAlF_5 \downarrow + 18H_3PO_4$ (filter to recover $CaAlF_5$)

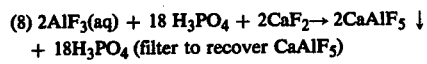

(9) $2CaAlF_5 \xrightarrow{\Delta}$ anhydrous $CaAlF_5$

(10) $2CaAlF_5 + 5SO_3 + 5H_2O \rightarrow 2\ CaSO_4 + Al_2(SO_4)_3 + 10\ HF$ (recycle $CaSO_4$ and $Al_2(SO_4)_3$ mixture back to the ore attack step)

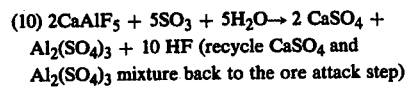

It should be appreciated that the above equations represent a somewhat idealized picture of a process of the invention. From the previous discussion it was indicated that the precipitates which are recovered often contain impurities such as iron, that there may be some coprecipitation of materials such as calcium dihydrogen phosphate along with fluoride values, and that intermediate steps may be required in such a process to further purify the fluorine containing precipitates from such contaminants. The process illustrated above is therefore to be regarded as only an idealized and simplified version of the kinds of reactions which actually occur.

With such a recycling procedure, the processes of this invention have lower raw materials cost than conventional processes of preparing hydrofluoric acid from calcium fluoride.

In the following examples, all parts are parts by weight unless otherwise indicated.

EXAMPLE 1

Ninety parts of a fluorapatite ore, 90% under 100 mesh, analyzing 3.1% fluoride, 6.7% $SiO_2$, 37.6% calcium, and 37.6% $P_2O_5$ are reacted with 54.1 parts of aluminum sulfate 18 hydrate $[(Al_2SO_4)_3.18\ H_2O]$, 67.75 parts of 96% sulfuric acid, and 156 parts of water. The resulting mixture is heated and stirred for 6 hours at 60° C., following which it is filtered and washed. Chemical analysis shows a 79% recovery of the phosphate values as aqueous $H_3PO_4$ and a 78.5% recovery of fluoride values as a soluble aluminum fluorosulfate.

The above reaction is carried out in a glass reaction vessel and at no time is there any evidence of fluoride attack or the evolution of HF fumes. Chemical analysis shows the silica content of the phosphoric acid, aluminum fluoride-aluminum sulfate liquid to be 0.02%. Analysis of the calcium sulfate-silica by-products of this reaction indicates that 98% of the silica originally present in the ore remains with the cake. The phosphoric acid aluminum fluorosulfate product is divided into several portions, and the following techniques can be applied to recover the fluoride values and separate them from the aqueous solution of phosphoric acid.

A portion is neutralized with ammonium hydroxide to a pH of 5 and heated. An insoluble ammonium aluminum fluorosulfate crystallizes from solution, leaving a soluble ammonium phosphate product which is processed in a conventional manner to prepare ammonium phosphate of fertilizer grade. The insoluble ammonium aluminum fluorosulfate is heated to thermally evolve ammonia, which can be used in a cyclical fashion for neutralization of additional materials. The anhydrous aluminumfluorosulfate remaining is reacted with an excess of sulfuric acid in a platinum boat in an inconel tube. It is heated between 200° and 275° C. for one hour, during which time recovery of the fluoride values is effected in the form of anhydrous hydrofluoric acid. The resulting aluminum sulfate-sulfuric acid mixture is employed for additional attack on a second batch of ore.

To a second portion of the aluminum fluorosulfate-phosphoric acid mixture is added a mixture of ammonium fluoride and ammonia in proportions such that sufficient fluorine is available from the ammonium fluoride plus the fluoride values recovered from the ore, that the fluoride to aluminum mole ratio in the system is 6 to 1 and with sufficient ammonia to give a 3 to 1 mole ratio of ammonia to the aluminum in the reaction mixture. Following a short time of heating and stirring, insoluble ammonium aluminum hexafluoride or ammonium cryolite precipitates out of solution and is recovered by filtration to give a solution of phosphoric acid substantially free of fluoride and aluminum values. The ammonium cryolite obtained is heated to dissociate the ammonium fluoride from the aluminum fluoride, and the ammonium fluoride is employed in subsequent reactions to add to additional mixtures of aluminum fluorosulfate and phosphoric acid in a cyclical fashion. The anhydrous aluminum fluoride obtained from the decomposition of ammonium cryolite is reacted at a temperature of 275° C. with an excess of sulfuric acid to give anhydrous hydrofluoric acid and an aluminum sulfate-sulfuric acid mixture which is recirculated in a cyclical fashion to attack subsequent batches of fluorophosphate ore.

To a third portion of the aluminum fluorosulfate-phosphoric acid mixture is added a small amount of magnesium phosphate, such that the mole ratio of magnesium to fluorine in the system is approximately 1 to 5. An insoluble magnesium aluminum fluorophosphate species precipitates and is removed by filtration. After drying, this precipitate, which contains substantially all of the fluoride values originally recovered from the ore, is reacted with sulfuric acid for 1 hour at 275° C. to give anhydrous hydrogen fluoride and a magnesium aluminum sulfate mixture dissolved in excess sulfuric acid.

EXAMPLE 2

A sample of fluorapatite ore having the following analysis:
$P_2O_5$ — 31.2%, calcium oxide — 44.8%, iron — 0.9%, aluminum — 0.8%, fluorine — 4.6%, $SiO_2$ — 8.0%, magnesium — 0.3%, $CO_2$ — 3.0%, sulfur — 0.3%, and water — 1.4%, is crushed and ground such that 90% of it passes through a 100 mesh screen. Four hundred thirteen parts of ore are reacted with a mixture of 461 parts of 85% phosphoric acid containing 78 parts of aluminum trihydroxide. The aluminum trihydroxide is first dissolved in the phosphoric acid mixture by heating for a short period of time at 100° C. The phosphoric acid and fluorapatite ore mixture are then refluxed for 14 hours at 105° C. The resulting mixture is suspended in a minimum amount of water and washed. After washing, the cake is dried at 110° C. overnight. Four hundred fifteen parts of cake are recovered. This represents approximately a 96% recovery of the calcium and phosphate values originally contained in the ore, along with the phosphate added in the form of aluminum phosphate.

Chemical analysis shows that the silica content is recovered essentially quantitatively, indicating no reaction between the fluorine content of the ore and silica. Essentially quantitative recovery of the fluorine originally contained in the ore in the form of aluminum fluorophosphate is obtained.

The aluminum fluorophosphate solution is evaporated to dryness and reacted with phosphoric acid at a temperature of 300° to 350° C. Anhydrous HF is obtained in essentially quantitative yield. The solution of aluminum phosphate in excess phosphoric acid formed by this reaction is used in a cyclical fashion to attack a second batch of fluorapatite ore.

EXAMPLE 3

The same quantities of materials as used in Example 1 are again employed, but this time the temperature of heating of the ore is raised to 200° C. After a two hour reaction period at 200° C., the ore is treated with a minimal amount of water and worked up in the same fashion as in Example 2. Essentially identical results can be obtained.

EXAMPLE 4

The same ore used in Example 1 and the same quantities of water and sulfuric acid are employed. The conditions used in reacting the ore are also the same. However, the quantities of aluminum sulfate added are adjusted to give a 4 to 1 and a 6 to 1 mole ratio of fluoride contained in the ore to aluminum added as a reactive aluminum sulfate salt instead of the 1 to 1 composition used in Example 1. Recovery of the ore after attack is as in Example 1.

The results in these two attacks on the ore are compared in Table I with Example 1 as to the distribution of fluoride in the gypsum cake, evolved as volatile fluorine species, and remaining in the phosphoric acid product.

Also included in the table is comparable data representing typical commercial practice, from an article by W. L. Hill and K. D. Jacob, as cited in Von Waser "Phosphorus and its Compounds", Vol. II, Chapter 16, page 1047. While the ore used and the method of processing it do not represent completely identical conditions with those employed in Example 1 and in this example, they do represent typical values which are often obtained in the operation of wet phosphoric acid process plants in Florida.

It will be noted in Table I that relative to usual commercial results, even the addition of a small amount of aluminum sufficient to represent 1/6 mole of aluminum per mole of fluoride contained in the ore substantially decreases the percent of fluoride retained in the gypsum cake as well as the percentage of fluoride lost by volatility. Note also that it minimizes attack on the silica impurity, since even at this relatively low level of aluminum, the fluorine-to-silicon ratio in the phosphoric acid product is increased.

TABLE I

Effect of Aluminum Salts Added During Attack on Ore on Distribution and Recovery of F

| F/Al Added as Reactive Al Salt | % F in Gypsum Cake | % F Evolved As $SiF_4$ | % F Remaining with $H_3PO_4$ | F/Si Ratio in $H_3PO_4$ |
|---|---|---|---|---|
| **∞ = Commercial practice | 29 | 39.5 | 31.6 | ~5/1 |
| 6/1 | 10.7 | 36 | 43.2 | 5.9/1 |
| 4/1 | 11.8 | 10.6 | 78.6 | 11.2/1 |
| 1/1 (Example 1) | 16.5 | 0 | 83.5 | 152/1 |

**Data taken from W. L. Hill and K. D. Jacob, as cited in Von Wase Phosphorus and its Compounds, Vol. II, Chapter 16, page 1047. Conditions of processing and attack similar to experimental runs but not identical, nor is source of ore the same.

These effects are much more striking at a 4 to 1 and a 1 to 1 ratio, where volatilization of fluoride values is substantially prevented, and at the 1 to 1 ratio, attack on the silica impurity to form any type of fluosilicic acid species is substantially totally prevented.

The fluorine values are recovered from the phosphoric acid product essentially quantitatively to give a phosphoric acid with a very low fluoride content by adding sufficient ammonia to the sample containing 4:1 fluoride-to-aluminum ratio to adjust the pH to 5. The fluoride precipitates as an ammonium aluminum fluoride.

In a similar fashion, addition of either sodium hydroxide or ammonia to the sample containing a 6 fluoride to 1 aluminum mole ratio effects separation of the fluoride values. In this case, the insoluble compound is sodium cryolite or ammonium cryolite $((NH_4)_3AlF_6)$. Heating the ammonium cryolite or other ammonium aluminum fluoride species at 400° to 500° C. volatilizes the ammonium fluoride and gives anhydrous aluminum fluoride. This can be reacted with sulfuric acid as in Example 1, to give substantially quantitative recoveries of anhydrous HF.

EXAMPLE 5

The process of Example 1 is repeated, but the $AlF-SO_4-H_3PO_4$ mixture obtained is reacted with $Ca(H_2PO_4)_2$, dissolved in phosphoric acid in equal quantity on a molar basis to the molarity of the sulfate plus the molarity of the $F^-/5$. An insoluble crystalline mixture of $CaAlF_5$ and $CaSO_4$ precipitates and is separated from the $H_3PO_4$ by filtration. This precipitate is dried to an anhydrous state and reacted with an excess of $H_2SO_4$ at 250°–350° C. to give a stoichiometric yield of anhydrous HF and an aluminum sulfate, calcium sulfate-sulfuric acid slurry. This is recycled to attack a new batch of fluorophosphate ore.

EXAMPLES 6–14

The following examples represent various attack conditions and illustrate the effect of various variables in the process such as reaction time, temperature, sulfate to calcium ratio, aluminum to fluorine ratio, etc., on the yields of fluorine recovered. Since a number of the variables in the attack are common to all of these examples, the results will be tabulated. In all cases, 516 parts by weight of a calcium fluorophosphate ore of the following analysis were employed. $P_2O_5$-31.2%, calcium oxide-44.8%, iron-0.9%, aluminum-0.8%, fluorine-3.68%, $SiO_2$-8.0%, magnesium-0.3%, $CO_2$-3.0%, sulfur-0.3%, and water-1.4%. This was crushed until 91% of it passed through a 100-mesh screen. This is a typical ore which comes from the Florida phosphate beds.

tity indicated by the recycle ratio in Column 4, over a 70-minute time period in 10 increments. The procedure employed was that 1/10 of the ore would be added followed by 1/10 of the sulfuric acid with both of these additions requiring 7 minutes, thus the total time of the run was 70 minutes. The batch was then held for the time given in Column 5. The additions were done at 95° C. Foaming caused by the evolution of the $CO_2$ contained in the ore upon being contacted with the acid was controlled by the addition of octyl-alcohol or silicone antifoaming agents.

At the end of the hold time, the batch was filtered giving a solution of phosphoric acid and the fluoride values as a soluble aluminum fluoride species. The filter cakes which were calcium sulfate-one-half hydrate mixed with the silica impurity originally associated with the ore, were washed and the washings were added to the product filtrate. This was analyzed for fluoride and Column 7 shows the percentage of fluoride originally in the ore recovered as a soluble species in the combined filtrate and wash. Column 8 gives the percentage of fluorine on the cake. The notation n.d. indicates that the fluorine on the cake was not determined in these instances.

TABLE II

| | | | Results of Examples 6–14 | | | |
|---|---|---|---|---|---|---|
| Example No. | $SO_4$ Mole ca Ratio | Al Mole F Ratio | Recycle Ratio | Holding Temperature | Holding Time | % F Recovered in Filtrate & Wash | % F Retained on Cake |
| 6 | 1.00 | 0.333 | 0.75 | 80° C | 1 hour | 78.9 | N.D. |
| 7 | 1.00 | 0.333 | 0.75 | 93° C | 1 hour | 83.2 | 18.0% |
| 8 | 1.00 | 0.333 | 0.75 | 94° C | 2 hour | 90.4 | N.D. |
| 9 | 1.00 | 0.333 | 0.75 | 94° C | 2.5 hours | 94.6 | N.D. |
| 10 | 1.00 | 0.333 | 0.75 | 94° C | 3 hours | 94.0 | N.D. |
| 11 | 1.00 | 0.333 | 0.75 | 97° C | 3 hours | 93.5 | N.D. |
| 12 | 1.00 | 0.333 | 0.75 | 97° C | 3 hours | 87.2 | N.D. |
| 13 | 0.90 | 0.333 | 1.50 | 107° C | 3 hours | 91.9 | 7.65% |
| 14 | 0.90 | 0.167 | 2.00 | 105° C | 3 hours | 90.3 | 8.00% |

All reactions were run in glass equipment since the presence of aluminum sulfate during all runs allowed the attack on the ore to proceed with no etching of the glassware by fluoride species. All reactions were run in a reaction solvent of 40% $P_2O_5$-phosphoric acid. Column 4 of Table II below headed "Recycle Ratio" indicates the weight ratio of $P_2O_5$ used as a reaction solvent to $P_2O_5$ contained in the ore for each particular run. Column 2 of Table II gives the total sulfate:calcium mole ratio. For example, a 1:1 ratio indicates that sufficient sulfate was introduced as aluminum sulfate and sulfuric acid to be equivalent on a molar basis to the calcium content of the ore. Similarly a 0.9:1 ratio indicates that less sulfate than that required to react stoichiometrically with the calcium content of the ore was used. In such a case, 10% of the calcium originally present in the ore would remain as a soluble calcium species in solution with the fluoride and phosphate values of the ore. Column 3 of Table II gives the molar ratio of aluminum introduced as aluminum sulfate to the fluorine contained in the ore. For example, a value of 0.333 would indicate that a third of a mole of aluminum was added as aluminum sulfate to the reaction per mole of fluorine contained in the ore.

Columns 5 and 6 give the holding temperature of the run and the holding time of the run, respectively.

The additions of the ore were done in a comparable fashion in all cases. In all instances an amount of sulfuric acid equivalent to the calcium as given by the ratio in Column 2 (adjusted for the sulfate as aluminum sulfate) were added in increments alternately with the ore to a heel of phosphoric acid containing 40% $P_2O_5$ in a quan- It can be concluded from the fluoride recovery values listed in this table, that for all hold times greater than 2 hours, 90% or better of the fluorine values in the ore and a comparable amount of the phosphate values (not shown in the table) were recovered in the filtrate and wash.

As shown in examples 13 and 14, even if some of the calcium originally present in the ore is retained in solution, there is no serious loss in fluoride recovery.

Example 14 also shows that volatilization losses are small even at high temperatures, relatively long reaction times, and added aluminum to fluoride mole ratios as low as 0.167. It should be noted, however, that the total aluminum and iron is probably higher than this due to impurities in the ore.

All of the cakes obtained in these examples filtered very rapidly and even the highest recycle ratio shown, 2:1, is substantially smaller than the approximately 8:1 recycle ratios normally employed in the phosphate industry using conventional processes.

The fact that all these runs could be conducted in glass equipment with negligible etching of the glass and negligible silica pickup shows the effectiveness of the aluminum salts in lowering fluoride activities.

EXAMPLE 15

This example illustrates a method for separating the fluoride from the phosphate values following acid attack on the ore. In this example the method was applied to the filtrate and washings of example 14.

100 Parts by weight of the product acid of example 14 were reacted with 3-times its volume in methanol. The phosphoric acid-calcium dihydrogen phosphate-aluminum fluoride mixture was heated to 60° C. and the methanol was slowly run in. This caused the precipitation of a crystalline calcium aluminum fluorophosphate species. Recovery of the fluorine values in the form of this species was essentially quantitative. This material was subsequently dried and reacted with 100% sulfuric acid to liberate anhydrous hydrogen fluoride in an essentially quantitative yield leaving behind a mixture of calcium sulfate, phosphoric acid, and aluminum sulfate. The calcium sulfate was filtered off and the phosphoric acid-aluminum sulfate can be recycled into further acid attacks on additional batches of ore.

EXAMPLE 16

150 g. of the product acid of example 6 were added to 5.5 g. of potassium hydroxide which was dissolved in approximately 25 g. of water. This was heated to 60° C., and 500 ml. of methyl alcohol were added. A precipitate formed which was allowed to stir and heat for approximately 10 minutes and then filtered. It was washed with methanol, allowed to air dry and placed in the vacuum oven at 90° C. for one hour. 28.35 G. of a product were recovered which contained 2.32 g. of fluorine by analysis. This represents a complete stoichiometric recovery of fluoride. Chemical analysis of the precipitate showed that it was a potassium-aluminum-iron fluorophosphate. This was dried and reacted with 100% sulfuric acid at 250° C. for an hour, the sulfuric acid being present in excess. A 95% recovery of HF was achieved. The potassium phosphate, aluminum sulfate, sulfuric acid mixture resulting was recycled for a subsequent attack on another batch of ore.

EXAMPLE 17

516 G. of the ore described for examples 6-14 were added in the fashion described for these examples to a reaction mixture of 300 g. of 50% $P_2O_5$ phosphoric acid and 333 g. of aluminum sulfate-18 hydrate in 10 equal increments alternating the additions of the ore with 10 equal increments of 442 g. of 96% sulfuric acid and 33 g. of water. The reaction temperature was 110° C., and the time for the additions was one hour. The mixture was stirred at 105° C. for 3 more hours and filtered. After washing, the combined filtrate and wash were analyzed for fluorine. It was determined that 87% of the fluorine originally in the ore was recovered as a soluble aluminum fluoride complex. To this were added 1800 cc. of isopropanol per 610 cc. of the combined filtrate and washings. This caused a separation into a fluid alcohol-rich phase, and a viscous water-rich phase. The water-rich phase was diluted after separation from the alcohol-rich phase, with 78 g. of water and totaled 478 g. Analysis of fluorine in the water-rich phase showed that 98% of the fluorine remained in the aqueous phase. Analysis of the alcohol-rich phase showed that 96% of the phosphate originally in the ore was present in this phase.

EXAMPLE 18

The previous example was repeated except that water saturated butanol was used as the extraction solvent for the phosphoric acid values instead of isopropanol. Essentially identical results were obtained with 95% fluorine being retained in the aqueous phase and 96% of the phosphoric acid being retained in the butanol phase. The fluorine values in this and the previous example were recovered by drying the aqueous phases to give an aluminum fluorophosphate which can be processed by reaction with sulfuric acid to give HF and to regenerate the aluminum sulfate for subsequent acid attacks.

I claim:

1. A method for treating fluorapatite ore to recover fluoride values contained therein, said method consisting essentially of
    (1) subjecting said ore to aqueous mineral acid attack to convert the phosphate contained in the ore to phosphoric acid in the presence of an added reactive metal compound selected from the group consisting of chloride, nitrate, sulfate, phosphate, bromide, perchlorate, hydroxyacetate, acetate, carbonate or hydroxide of aluminum, titanium, zirconium and trivalent iron, to convert the fluoride contained in the ore into a water-soluble fluoride complex in which a substantial portion remains in solution in the reaction medium and which is sufficiently stable to prevent the formation of fluosilicic acid, said amount of reactive metal compound being present in a molar ratio of reactive metal compound to fluorine content in said ore of from about $1/(V + 3)$:1 to 2:1, where V is the valence of the reactive metal cation; and
    (2) adding sufficient alcohol having from 1 to 4 carbon atoms to obtain a phase separation of the fluoride complex from the phosphoric acid-alcohol solution.

2. The method of claim 1 with the additional step of thereafter reacting said fluoride complex at a temperature of from about 150° C. to 400° C. with a mineral acid to form anhydrous hydrofluoric acid.

* * * * *